Nov. 23, 1937. P. E. MATTHEWS 2,100,285
INDEPENDENTLY SPRUNG FRONT WHEEL
Filed Dec. 12, 1934 2 Sheets-Sheet 1
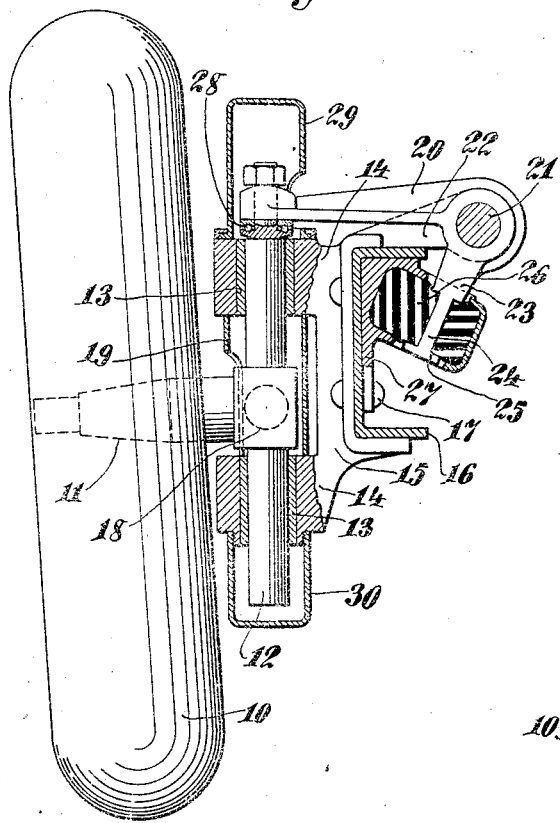
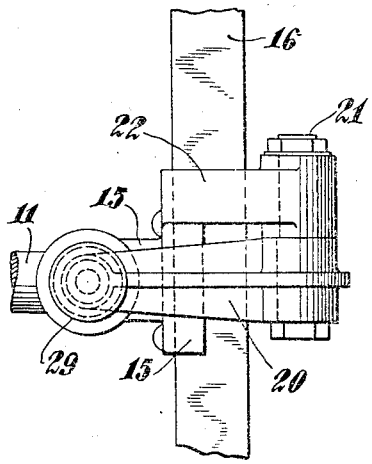
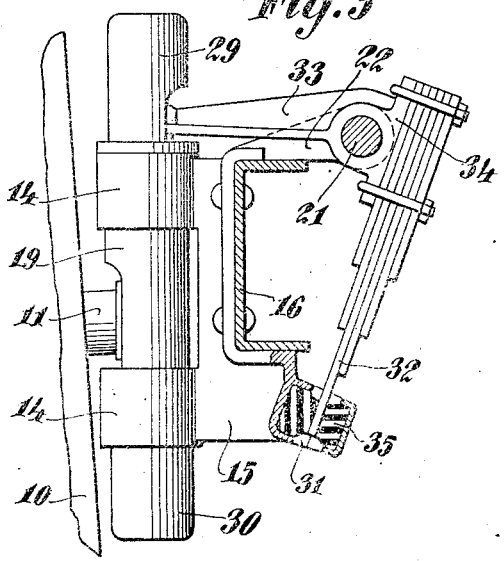
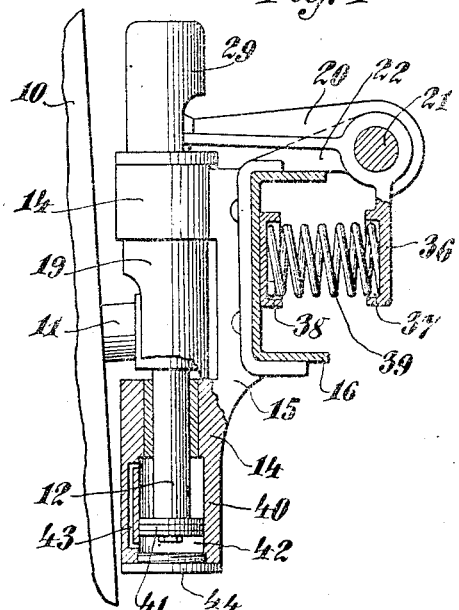
INVENTOR.
Philip E. Matthews,
BY Hoguet, Neary + Campbell
HIS ATTORNEYS Nov. 23, 1937.     P. E. MATTHEWS     2,100,285
INDEPENDENTLY SPRUNG FRONT WHEEL
Filed Dec. 12, 1934          2 Sheets-Sheet 2
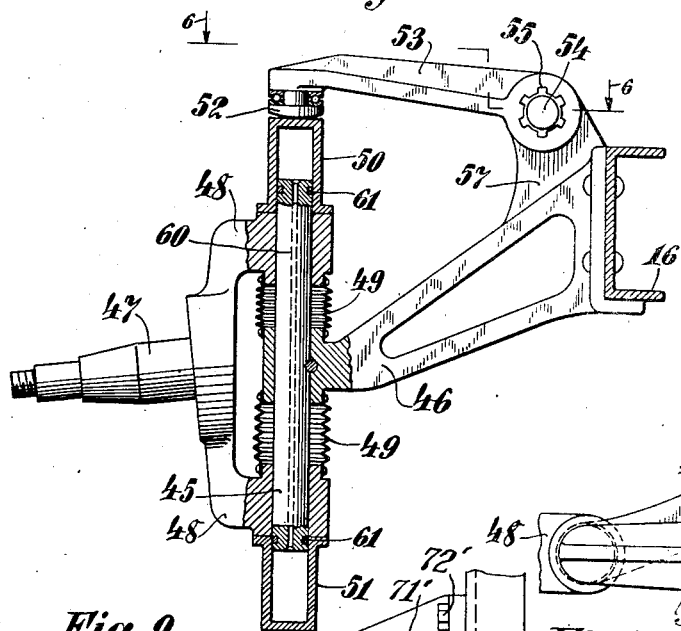
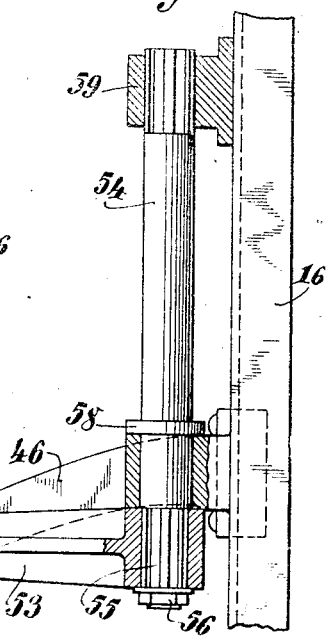
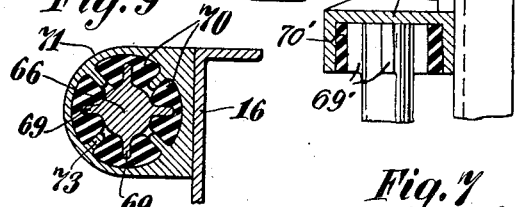
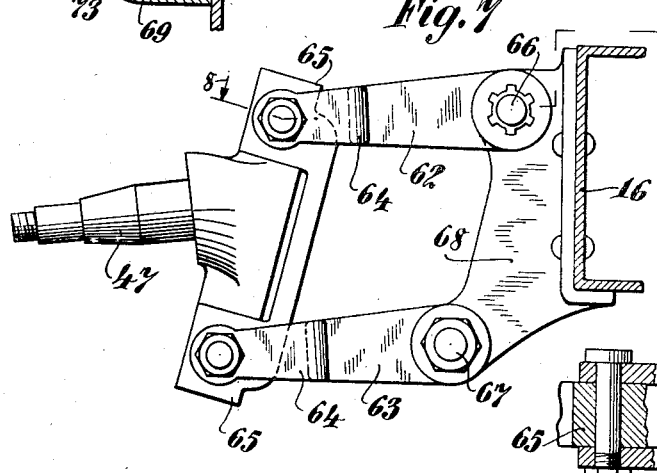
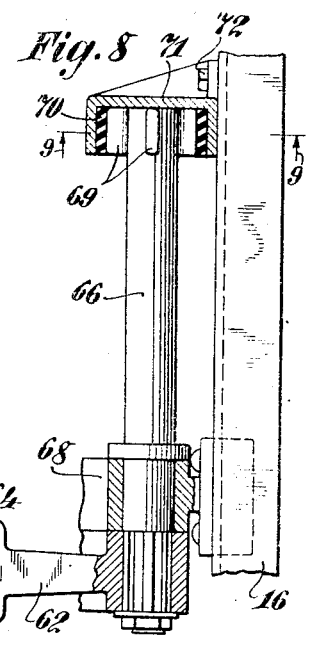
INVENTOR:
Philip E. Matthews,
BY
Hoguet, Neary & Campbell
HIS ATTORNEYS Patented Nov. 23, 1937

2,100,285

UNITED STATES PATENT OFFICE 2,100,285

INDEPENDENTLY SPRUNG FRONT WHEEL

Philip E. Matthews, Plainfield, N. J., assignor to Mack Manufacturing Corporation, a corporation of Delaware Application December 12, 1934, Serial No. 757,089

6 Claims. (Cl. 267—57)

The present invention relates to spring suspensions for motor vehicles and embodies, more specifically, an improved mechanism by means of which a vehicle wheel may be independently sprung upon the vehicle frame.

Independent wheel mountings wherein the wheel is sprung upon the frame independently of other wheels have been designed heretofore and in perfecting these designs, leaf springs have frequently been used. These springs require a long narrow space and frequently present considerable difficulty in the matter of design to accommodate the spring in the vehicle structure. Since a leaf spring operates on the principle of tension and compression it will not absorb as much energy per cubic inch as other forms of springs, for example, coil springs and torsion springs. The present invention, therefore, proposes to utilize a torsion spring in providing an independently sprung wheel structure, thus expediting the design and association of parts and providing a spring which will absorb more energy per cubic inch than leaf spring designs. In this connection, torsion springs operate on the principle of shear, thus causing them to absorb more energy as above noted.

An object of the invention, accordingly, is to provide an independently sprung wheel structure wherein the wheel is effectively and securely mounted upon the vehicle frame and motion thereof with respect to the frame is effectively cushioned.

A further object of the invention is to provide an independent spring mounting for a vehicle wheel wherein a torsion spring is utilized to cushion relative motion between the wheel and frame.

A further object of the invention is to provide an independent spring mounting for vehicle wheels wherein the wheel is adapted to turn about a vertical axis as well as about its normal horizontal axis, the structure being of great strength and effectively cushioning relative movement between the wheel and frame.

Further objects, not specifically enumerated above, will be apparent as the invention is described in greater detail in connection with the acompanying drawings, wherein:

Figure 1 is a view in end elevation, partly broken away and in section showing an independent spring mounting constructed in accordance with the present invention.

Figure 2 is a plan view of the construction shown in Figure 1.

Figure 3 is a view similar to Figure 1, showing a modified form of the invention wherein a leaf spring is employed.

Figure 4 is a view similar to Figure 3, showing the use of a coil spring for cushioning relative motion between the wheel and frame.

Figure 5 is a view similar to Figure 1, showing a structure in which a torsion spring is utilized.

Figure 6 is a plan view of the construction shown in Figure 5, partly broken away and in section, taken on line 6—6 of Figure 5, and looking in the direction of the arrows.

Figure 7 is a view in end elevation showing a further modified form of the invention.

Figure 8 is a view in section, taken on line 8—8 of Figure 7, and looking in the direction of the arrows.

Figure 9 is a view in section, taken on line 9—9 of Figure 8, and looking in the direction of the arrows.

Figure 10 is a plan view, partly broken away and in section, showing a further modified form of the invention.

Referring to the above drawings, a vehicle wheel is shown at 10 as mounted upon a spindle 11 carried by a king pin 12. The king pin is journaled in bearings 13 which are carried by spaced arms 14, formed upon a bracket 15. Bracket 15 may be secured to a vehicle frame 16 by means of rivets 17 and the king pin 12 is thus adapted to slide vertically on its axis between the limits provided by the arms 14. A steering knuckle arm 18 is provided on the king pin and a sleeve guard 19 mounted between the arms 14 of the bracket 15.

In order that axial motion of the floating king pin 12 may be suitably cushioned, a crank arm 20 is journaled upon the frame at 21. If desired, this journal may be formed upon an extension 22 of bracket 15. The crank arm 20 has an extension 23 with a portion 24 formed with opposed seats 25 in which blocks of yielding non-metallic material 26, such as rubber, may be received. The yieldable blocks 26 are mounted within a bracket 27 which is secured to the frame 16, adequate provision being made for relative movement of the arm 23 with respect to the bracket 27.

The extremity of crank arm 20 terminates above the floating king pin 12 and has mounted therein a thrust bearing 28 which is adapted to engage against the upper extension of the king pin 12 and receive the thrust thereof. This thrust will be transmitted to the vehicle frame through the arm 20 and 23 in a manner which will be readily apparent. Upper and lower protective bonnets 29 and 30, respectively, may be provided in the elements which are movable with respect to the bracket 15.

In the construction shown in Figure 3, bracket 15 is formed with a housing 31 which is adapted to receive blocks of yielding non-metallic material 35 between which the end of a cantilever leaf spring 32 is adapted to be receive. Spring 32 is anchored to one end of a lever 33 upon which a mounting plate 34 is formed. Lever 33 is journaled at 21, as described in connection with crank arm 20 and the operation of the construction shown in Figure 3 will be seen to include the action of a cantilever spring as well as the cushioning pads 35 which are mounted within housing 31.

In the construction shown in Figure 4, the bell crank lever 20 of Figure 1 is formed with an arm 36 within which a spring seat 37 is formed. A cooperating seat 38 is secured to the frame 16 and a coil spring 39 is mounted between the seats to cushion relative motion of the arm 36 with respect to the frame. The arm 14 of the bracket 15 is formed with a downwardly extending cylindrical portion 40 in which the end of the floating king pin 12 moves. To provide a shock absorbing mechanism, a piston 41 is formed upon the end of the king pin 12 and is received within a cylindrical recess 42 formed in the extension 40. A by-pass 43 is formed in the extension 40 to permit a restricted flow of fluid from one end of the cylinder 42 of one side of Figure 1 to the other end. A suitable cap 44 serves as a closure for the cylinder and the construction shown in Figure 4 thus not only affords a spring cushioning effect by reason of the coil spring 39 but also a shock absorbing effect by reason of the fluid mechanism just described.

In the construction shown in Figures 5 and 6 a further modified form of the invention is illustrated, this construction employing a stationary king pin 45, secured to a bracket 46 which is mounted upon the frame 16. The wheel spindle 47 is formed with opposed bearing arms 48 which are journaled upon the king pin 45 and are adapted to slide axially thereon. The protective boots 49 may be secured to the adjacent sides of the arms 48 and the end of bracket 46 to protect the surface of the king pin 45. Upper and lower bonnets 50 and 51 are secured to the arms 48 in such fashion that the ends of the king pin 45 may be received therein. The upper bonnet 50 is adapted to bear upon a thrust bearing 52 which is carried by the extremity of an arm 53 which is rigidly secured to a torsion spring member 54. In the form shown, the arm 53 is splined to the spring 54 at 55, a nut 56 securing the elements together. An extension 57 is formed on bracket 46 to journal the spring therein, a positioning flange 58 being provided on the spring to locate the same effectively. The spring 54 is anchored in a bracket 59 which is secured to the vehicle frame 16, thus providing an effective torsion spring mounting.

In addition to the spring effect provided by the above mounting a shock absorbing action is obtained utilizing the bonnets 50 and 51 as shock absorbing cylinders which may be filled with a suitable fluid, such as oil. The king pin 45 is drilled to provide an oil passage hole 60 through which oil may flow in a suitably restricted fashion to provide the desired shock absorbing effect. Piston rings 61 may be mounted in the ends of the king pin 45 to provide an effective seal between the relatively moving parts.

In the construction shown in Figures 7, 8, and 9, a torsion spring mounting is shown embodying an adaptation of the construction shown in Figures 5 and 6. In this construction a parallelogram action is provided by means of parallel arms 62 and 63 which are formed with bifurcated extremities 64 between which a conical mounting 65 is secured. The conical mounting carries the wheel spindle 47 and motion thereof in vertical planes is transmitted to the vehicle frame through the parallel arms 62 and 63 which are anchored to the ends of torsion springs 66 and 67, respectively. The ends of the torsion springs adjacent the arms 62 are journaled in a bracket 68 which is secured to the frame 16 while the other ends of the springs are formed with projecting fins 69 which constitute seats about which blocks of yielding non-metallic material 70 are positioned. These blocks are mounted in a housing 71 which may be secured to the frame 16 by means of bolts 72, the housing 71 being formed with inwardly projecting flanges 73 which are adapted to lie between the fins 69 and serve as seats for the blocks of yielding non-metallic material 70. In this fashion, the motion of the spindle 47 in vertical planes is cushioned by the torsion springs 66 and 67, as well as by the blocks of yielding non-metallic material 70. Obviously, only one torsion spring may be used, if desired, and this single spring may be anchored to either of the arms 62 or 63.

In the construction shown in Figure 10, a non-metallic connection between the torsion spring and frame, as shown in Figure 8, is adapted to the suspension elements shown in Figure 6. The torsion spring 54 is formed with projecting fins 69' which constitute seats about which blocks of yielding non-metallic material 70' are positioned. These blocks are mounted in a housing 71' which may be secured to the frame 16 by means of bolts 72'. The remaining elements shown in this figure correspond to the similar elements shown in Figure 6.

Further modifications and adaptations of the invention will be apparent to those skilled in the art, and the invention is not to be limited, save as defined in the appended claims.

I claim as my invention:

1. An independent wheel mounting comprising a vehicle frame, means to mount a wheel on the frame with provision for vertical movement thereof with respect to the frame, an arm movable with respect to the frame, a torsion spring anchored to the arm, yielding non-metallic means to secure the spring to the frame, and a thrust bearing on the end of the arm engaging the wheel mounting means.

2. An independent wheel mounting comprising a vehicle frame, a bracket on the frame, means to mount a wheel on the bracket with provision for vertical movement, an arm movable with respect to the frame, a thrust bearing between the arm and wheel mounting means, a torsion spring anchored at one end on the frame and journaled adjacent the other end thereof on the frame, means to anchor the arm to the journaled end of the spring, a bore through the mounting means, and means on the bracket and mounting means at opposite ends of the bore to absorb shocks.

3. An independent wheel mounting comprising a vehicle frame, means to mount a wheel on the frame with provision for vertical movement thereof with respect to the frame, an arm movable with respect to the frame, a torsion spring anchored to the frame and to the arm, means to transmit force from the wheel mounting means to the arm, and fluid means on the wheel mounting means to absorb shocks.

4. An independent wheel mounting comprising a vehicle frame, means to mount a wheel on the frame with provision for vertical movement thereof with respect to the frame, an arm movable with respect to the frame, a torsion spring anchored on the arm, yielding non-metallic means to secure the spring to the frame, and means to transmit forces from the wheel mounting means to the arm.

5. An independent wheel mounting comprising a vehicle frame, means to mount a wheel on the frame with provision for vertical movement thereof with respect to the frame, an arm movable with respect to the frame, a torsion spring anchored on the arm, yielding non-metallic means to secure the spring to the frame, means to transmit forces from the wheel mounting means to the arm, and fluid means on the wheel mounting means to absorb shocks.

6. An independent wheel mounting comprising a vehicle frame, a bracket on the frame, a pin mounted vertically on the bracket, means to mount a wheel slidably on the pin with provision for vertical movement thereof with respect to the frame, an arm movable with respect to the frame, a torsion spring anchored to the frame and to the arm, and means to transmit forces from the wheel mounting means to the arm.

PHILIP E. MATTHEWS.